United States Patent [19]

Blanchard et al.

[11] Patent Number: 5,464,895
[45] Date of Patent: Nov. 7, 1995

[54] ORGANOPHOSPHATE DISPERSING AGENT, FILLED THERMOSETTING COMPOSITION CONTAINING SAME, AND APPLICATION THEREOF

[75] Inventors: Pierre Blanchard, Reyrieux; Jean-Bernard Egraz, Ecully; Georges Ravet, St Genis-les-Ollieres, all of France

[73] Assignee: Coatex, S.A., Caluire, France

[21] Appl. No.: 314,905

[22] Filed: Sep. 29, 1994

Related U.S. Application Data

[62] Division of Ser. No. 820,257, Jan. 14, 1992, Pat. No. 5,412,139.

[30] Foreign Application Priority Data

Jan. 16, 1991 [FR] France ................... 91 00645

[51] Int. Cl.$^6$ ................ C08K 3/26; C08K 3/30; C07F 9/02
[52] U.S. Cl. .............. 524/425; 558/186; 524/139; 524/141; 524/157; 524/158; 524/369; 524/423; 524/430
[58] Field of Search .............. 558/186; 524/139, 524/141, 157, 158, 369, 423, 425, 430

[56] References Cited

U.S. PATENT DOCUMENTS 4,183,843  1/1980  Koenig et al. ................ 523/216

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

A dispersing agent for use in a thermosetting composition, a thermosetting composition containing said dispersing agent, and application thereof to thermosetting composition having no yield point. The dispersing agent acting on mineral fillers and used in filled acrylic or polyester resin-based thermosetting compositions belongs to the family of organophosphates corresponding to the general formula:

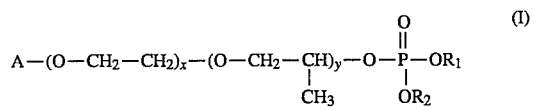

where:
A is a branched or unbranched polyaryl group,
x and y are whole numbers between 0 and 100 such that x+y is a whole number greater than 40 but not greater than 100,

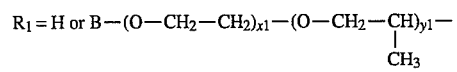

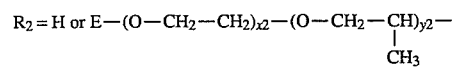

B and E are independently a branched or unbranched polyaryl group, or an alkyl, aryl, arylalkyl, alkylaryl, alkanoyl, or amine radical, and in B and E, and $R_1$ and $R_2$ may be identical or different, x1, y1, x2 and y2 are whole numbers, and the sums x1+y1 and x2+y2 are not greater than 100.

12 Claims, 3 Drawing Sheets

ORGANOPHOSPHATE DISPERSING AGENT, FILLED THERMOSETTING COMPOSITION CONTAINING SAME, AND APPLICATION THEREOF

This is a division of application Ser. No. 07/820,257, filed on Jan. 14, 1992 U.S. Pat. No. 5,412,139.

BACKGROUND OF THE INVENTION

Field of the Invention

The present invention relates to a new organophosphate dispersing agent and a thermosetting composition, comprising a thermosetting unsaturated polyester resin containing a monomer which may subsequently be copolymerized with the polyester resin, or an alkyd-, acrylic- or phenolic-type molding resin, a pulverulent mineral filler, and a dispersing agent. The dispersing agent makes it possible to obtain highly-filled thermosetting molding compositions having no yield point and low viscosities under very low shear ratios.

Discussion of the Background

During the fabrication of molded articles from a composition based on thermosetting resins of unsaturated polyester, alkyd, acrylic, or phenolic-type molding resins, in accordance with one of the conventional sheet-molding (sheet molding composition—SMC) and bulk molding (bulk molding composition—BMC) techniques, it becomes increasingly necessary to increase the quantity of mineral filler in order to reduce the cost of the molded articles. It is also necessary to preserve mechanical, thermal, dielectric, and aesthetic properties of the resins, as well as to obtain a viscosity of the mixture which is as low as possible at high and low shear ratios. In fact, the lack of a yield point allows the resin to be easily worked at all stages of the molding operation. In order to add fillers to these resins, the use of conventional organophosphate dispersing agents is well known.

Patent Applications JP 61-101527, JP 62-207337, JP 62-235353 disclose the addition of organophosphates to mixtures containing a maximum of 100 parts filler for 100 parts resin. For greater concentrations of mineral filler ranging up to 65%, U.S. Pat. No. 4,183,843 claims the use of polar esters of phosphoric acid. When used in small proportions, these products reduce the viscosity of the mixture of calcium carbonate and/or aluminum hydroxide and/or titanium dioxide and/or silicon dioxide and/or clay with unsaturated polyester-type resins under high shear ratios. However, the viscosity under very low shear ratios remains very great and there exists a yield point which makes the formulations difficult to handle. Furthermore, it has been observed that the viscosity of the thermosetting composition increases in a directly proportional manner to the quantity of these polar phosphated esters used, resulting in a thickening effect.

SUMMARY OF THE INVENTION

Accordingly, one object of this invention is to provide a thermosetting molding composition having no yield point and low Brookfield viscosities under high shear ratios and containing a dispersing agent and up to 75% by weight of a pulverulent mineral filler.

A further object of this invention is to provide a new dispersing agent that can be added to a thermosetting composition filled up to 75% by weight without producing a thickening effect.

A further object of this invention is to provide a new dispersing agent that can be added to a highly-filled thermosetting composition without producing a yield point, and without affecting the mechanical, thermal, dielectric, and aesthetic properties of the thermosetting composition.

A further object of the invention is to provide a new dispersing agent that can be added to a highly-filled thermosetting composition without producing a yield point and can be used in sheet-molding composition (SMC) and bulk molding composition (BMC) techniques.

A further object of the invention is to improve the surface state (Low Profile) of articles fabricated using a thermosetting composition containing the dispersing agent according to the invention.

These objects are achieved by preparing a thermosetting composition, comprising:

(a) a thermosetting resin, (b) a pulverulent mineral filler in a quantity ranging up to 75% by weight of the total weight of the resin and the filler, (c) an organophosphate dispersing agent, in an amount of 0.3 to 5% by weight of the weight of the filler, having the general formula:

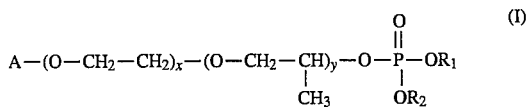

where:

A is a branched or unbranched polyaryl group, x and y are whole numbers between 0 and 100 such that x+y is a whole number greater than 40 but not greater than 100,

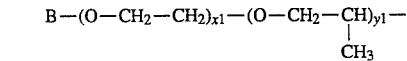

x1 and y1 are whole numbers between 0 and 100 such that x1+ y1 is a whole number not greater than 100, B is a branched or unbranched polyaryl group, or an alkyl, aryl, arylalkyl, alkylaryl, alkanoyl, or amine radical,

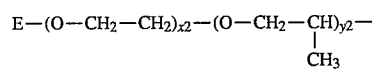

x2 and y2 are whole numbers between 0 and 100 such that x2 + y2 is a whole number not greater than 100, E is a branched or unbranched polyaryl group, or an alkyl, aryl, arylalkyl, alkylaryl, alkanoyl, or amine radical, and $R_1$ and $R_2$ may be identical or different.

These objects are further achieved by using an organophosphate dispersing agent for acting on mineral fillers in thermosetting resins, wherein said agent has the following general formula (I):

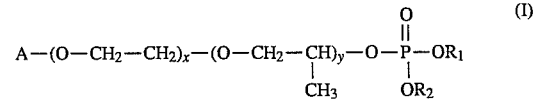

where:

A is a branched or unbranched polyaryl group, x and y are whole numbers between 0 and 100 such that x+y is a whole number greater than 40 but not exceeding 100,

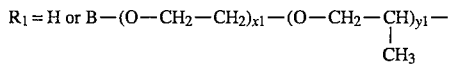

x1 and y1 are whole numbers between 0 and 100 such that x1+ y1 is a whole number not greater than 100, B is a branched or unbranched polyaryl group, or an alkyl, aryl, arylalkyl, alkylaryl, alkanoyl, or amine radical,

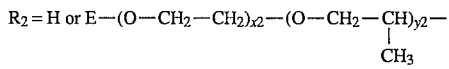

x2 and y2 are whole numbers between 0 and 100 such that x2+y2 is a whole number not greater than 100, E is a branched or unbranched polyaryl group, or an alkyl, aryl, arylalkyl, alkylaryl, alkanoyl, or amine radical, and $R_1$ and $R_2$ may be identical or different.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
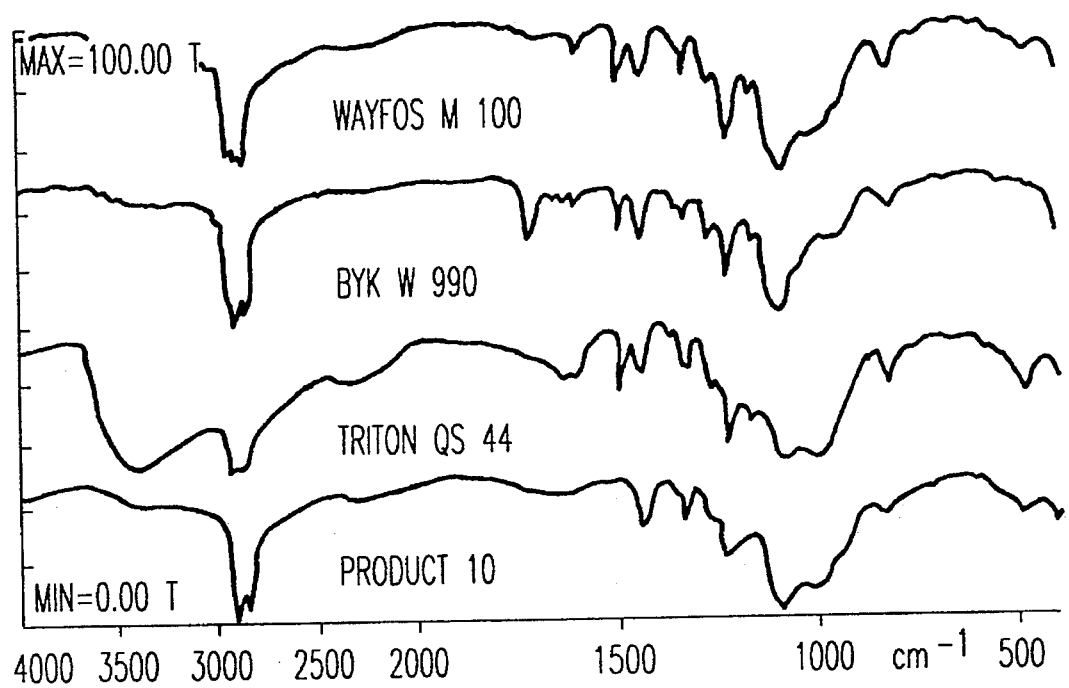
FIGS. 1–3 show the infrared spectrum of various dispersing agents disclosed herein.

The dispersing agent corresponding to general formula (I) preferably contains a branched or unbranched polyaryl group A having molecular weight range between 127 and 2000. B and E, may be branched or unbranched polyaryl groups, or alkyl, aryl, arylalkyl, alkylaryl, alkanoyl, or amine radicals, preferably containing up to 18 carbon atoms. The polyaryl group A may be di(phenyl-1-ethyl) phenols, commonly called distyrylphenols, tri(phenyl-1-ethyl) phenols, commonly called tristyrylphenols, and oligomers of polystyrene or styrene copolymer oligomers with another monomer. B and E may be the same as the above-mentioned radicals A and may be lauryl, stearyl, nonyl-phenol, etc. The sum x+y is preferably 50 to 60.

While the prior art discloses polar phosphate ester-type dispersants which are added in quantities of from 0.05% to 1% by weight in relation to the weight of the filler in filled thermosetting composition having a filler content ranging up to 65% of the total weight of the filler and the thermosetting resin, the dispersing agent having the general formula (I) according to the invention is added in a quantity of from 0.3% to 5%, and preferably from 0.5% to 3%, by weight in relation to the weight of the filler. The dispersing agent having the general formula (I) is added while stirring the thermosetting resin just before, just after, or simultaneously with the addition of the pulverulent mineral filler in a quantity ranging up to 75% by weight in relation to the total weight of the resin and of the pulverulent mineral filler.

The thermosetting composition according to the invention comprises a thermosetting resin, a quantity of pulverulent mineral fillers ranging up to 75% by weight of the weight of the resin and the filler, the dispersing agent according to the invention, and optionally, other additives. The composition has no yield point, i.e., it has low viscosity under a very low shear ratio, and has a viscosity less than or equal to that of compositions according to prior art under higher shear ratios.

The thermosetting filled composition may comprise:

(a) a thermosetting resin chosen from among acrylics, phenolic molding compositions, alkyds, unsaturated polyesters produced by the condensation reaction of maleic anhydride, optionally in the presence of phthalic anhydride, and an alkylene glycol or polyalkylene glycol having a low molecular weight, and styrene can be copolymerized with the polyester resins and/or unsaturated polyester resins;

(b) a quantity of up to 75% by weight in relation to the total weight of the resin and the pulverulent mineral filler, of a pulverulent mineral filler chosen from among the mineral salts and/or oxides, such as natural or precipitated calcium carbonate, magnesium carbonate, zinc carbonate, dolomite, calcium sulfate, aluminum hydroxide, metallic oxides such as zinc oxide, iron oxides, titanium oxide, wollastonite, and more particularly chosen from among calcium carbonate, aluminum hydroxide, calcium sulfate, and titanium oxide;

(c) a quantity of between 0.3% and 5% by weight, and preferably from 0.5% to 3% by weight, of the weight of the filler of the organophosphate dispersing agent having the general formula (I); and (d) optionally, other conventional additives chosen, in particular, from among thermal or photochemical stabilizers, oxidation inhibitors, shrinkage inhibitors, static inhibitors, plasticizers, lubricants, unmolding agents, flame retardants, glass fibers and balls, and mineral thickeners such as magnesium hydroxide.

The thermosetting composition containing the dispersing agent according to the invention is characterized by its Brookfield viscosities under high and low shear ratios, measured using an RVT-type Brookfield viscometer at different rotating speeds of the module. The dispersing agent having the general formula (I) is characterized by its acid value, measured using a titrimetric method in accordance with standard NF T30-402 and by its infrared spectrum produced using the IR 398 infrared spectrophotometer equipped with a 3 600 DATA terminal station marketed by the PERKIN ELMER Corporation.

Other features of the invention will become apparent in the course of the following description of exemplary embodiments which are given for illustration of the invention and are not intended to be limiting thereof.

EXAMPLE 1

Preparation of the Thermosetting Composition

In a glass crucible of approximately 500 ml equipped with a GRENIER-CHARVET laboratory stirring apparatus, 200 g of an unsaturated polyester resin marketed by WALTER MADER AG under the name CRISTIC 192 LV and having a Brookfield viscosity of 350 mPa.s at 10R/mn, 20° C. module 3, and 370 mPa.s at 100R/mn, 20° C. module 3, was added to 2 g of a dispersing agent. The mixture was then homogenized for 30 seconds using the stirring apparatus at a rate of 1,000 R/mn. Next, 200 g of an aluminum hydroxide pulverulent mineral filler, of which 50% of the particles were less than 2.3 μm and all of the particles were less than 50 μm, marketed by the MARTINSWERK company under the name MARTINAL OL 104-C, was added to the mixture of over 10 minutes under agitation while increasing the speed gradually to 2,000 R/mn.

Measurement of the Rheology of the Composition

The composition was kept at 23° C. for 48 hours. After temperature verification, the same module 6 of the RVT-type Brookfield viscometer was used to measure the Brookfield viscosities of the composition obtained under different shear ratios at a temperature of 23° C.

This operating method was carried out for each of the following dispersants:

Test 1

Dispersant according to prior art marketed by ROHM & HAAS under the name TRITON QS-44, having an acid value of $I_A=294$ mg/g according to Standard NF T30-402. The infrared spectrum is shown in FIG. 1.

Test 2

Dispersant according to prior art marketed by PHILIP A. HUNT Company under the name WAYFOS M100, having an acid value of $I_A=148$ mg/g according to Standard NF T30-402. The infrared spectrum is shown in FIG. 1.

Test 3

Dispersant according to prior art marketed by the BYK Company under the name BYK W990, having an acid value of $I_A=88$ mg/g according to Standard NF T30-402. The infrared spectrum is shown in FIG. 1.

Test 4

Dispersant according to the invention, named product 4, composed of a mixture containing 41% of a phosphoric monoester and 59% of a phosphoric diester having general formula (I), where:
For the monoester:

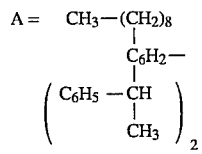

$x=48$ $y=2$ $R_1 = R_2 = H$

For the diester:

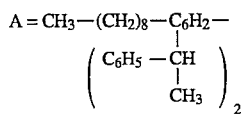

Figure 2:
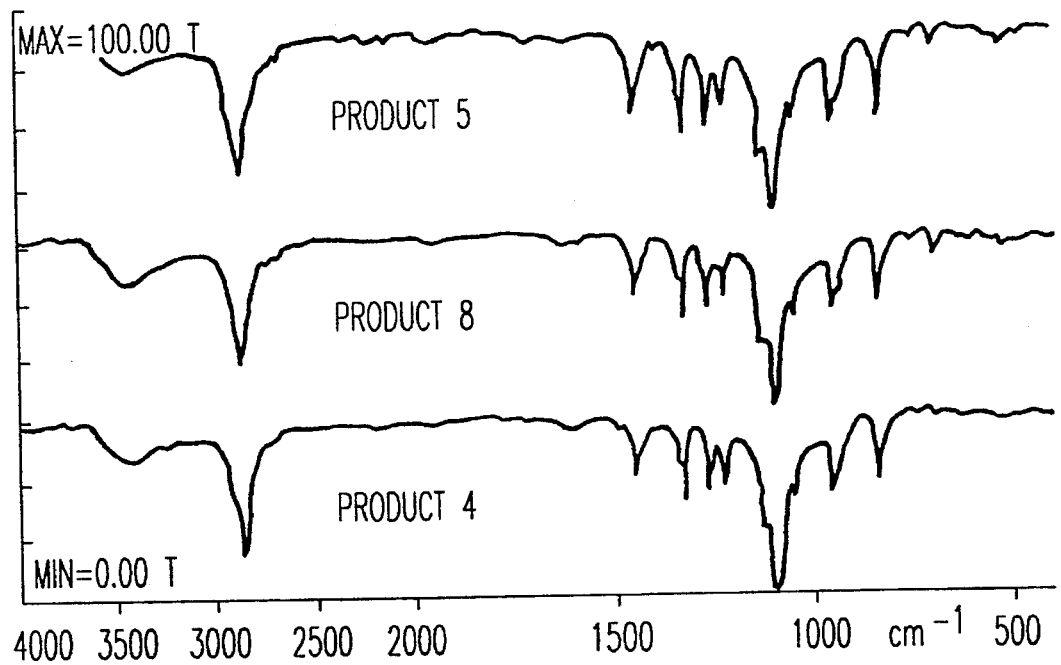

$x=48$ $y=2$ $R_1 = B-(O-CH_2-CH_2)_{x1}-(O-CH_2-CH)_{y1}-$
<br>$\qquad\qquad\qquad\qquad\qquad\qquad\qquad\qquad\quad CH_3$ $x1=48$ $y1=2$ $B=A$ $R_2=H$ An acid value of $I_A=56$ mg/g was determined in accordance with Standard NF T30-402. The infrared spectrum is shown in FIG. 2.

Test 5

Dispersing agent according to the invention, named product 5, composed of a phosphoric monoester having general formula (I), where:

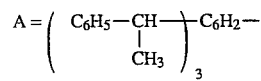

$x=100$ $y=0$ $R_1=R_2=H$

An acid value of $I_A=25$ mg/g was determined in accordance with Standard NF T30-402. The infrared spectrum is shown in FIG. 2.

Table I presents the Brookfield viscosities measured for each of the above-mentioned compositions, all of which have the same base resin (CRISTIC 192 LV), the same MARTINAL OL-104-C content (50% by weight of the total of the resin and the filler), the same dispersant content (1% by weight of the filler), but as the single variable, the chemical formula of the dispersing agent.

TABLE I

| TEST | NO. | PRIOR ART | | | INVENTION | |
|---|---|---|---|---|---|---|
| | | 1 | 2 | 3 | 4 | 5 |
| Resin | Type | Cristic 192 LV | Cristic 192 LV | Cristic 192 LV | Cristic 192 LV | Cristic 192 LV |
| Filler | Type | Martinal OL 104 C | Martinal OL 104 C | Martinal OL 104 C | Martinal OL 104 C | Martinal OL 104 C |
| | Quantity in % by weight of the filler and resin | 50% | 50% | 50% | 50% | 50% |
| Dispersant | Type | Triston | Wayfos | BYK | Product | Product |

TABLE I-continued

|  |  | QS-44 | M100 | W990 | 4 | 5 |
|---|---|---|---|---|---|---|
|  | Quantity in % by weight of the filler | 1% | 1% | 1% | 1% | 1% |
| Brookfield viscosity module 6 in mPa · s (cP) | 0.5 R/mn | 180,000 | 182,000 | 162,000 | 10,000 | 14,000 |
|  | 1 R/mn | 106,000 | 110,000 | 102,000 | 10,000 | 13,000 |
|  | 2.5 R/mn | 54,800 | 56,000 | 54,000 | 8,800 | 10,000 |
|  | 5 R/mn | 34,000 | 34,000 | 34,000 | 7,200 | 8,200 |
|  | 10 R/mn | 21,600 | 21,600 | 21,800 | 6,200 | 7,500 |
|  | 20 R/mn | 14,200 | 14,200 | 14,500 | 5,250 | 6,650 |
|  | 50 R/mn | 8,540 | 8,400 | 8,800 | 4,300 | 5,940 |
|  | 100 R/mn | 6,700 | 5,900 | 6,400 | 3,900 | 5,550 |

Table I shows that the thermosetting compositions containing the dispersing agent according to the invention have low Brookfield viscosities under low shear ratios (0.5 R/mn to 20 R/mn) and high shear ratios (beginning at 50 R/mn) and have no yield point. The compositions obtained using prior art dispersing agents possess a yield point. Moreover, the compositions containing the dispersing agent according to the invention possess Brookfield viscosities that are lower than those obtained using a prior art dispersing agent at all tested shear ratios.

EXAMPLE 2

Under the same conditions as in Example 1, 400 g of natural calcium carbonate, having particle sizes smaller than 50 µm, 50% of which are smaller than 3.2 µm, and marketed by OMYA, S.A. under the name MILLICARB were added to a mixture of 200 g of an unsaturated polyester resin marketed by WALTER MADER AG under the name CRISTIC 192 LV and 2 g of dispersing agent.

Using the same operating procedure as in Example 1, the Brookfield viscosities of the thermosetting compositions containing the following dispersing agents were measured:

Test 6

Dispersant according to prior art marketed by PHILIP A. HUNT under the name WAYFOS M100, previously used in Test 2.

Test 7

Dispersant according to the invention, called product 4, previously used in test 4.

Test 8

Disperant according to the invention, called product 8, composed of a phosphoric monoester corresponding to general formula (I), where:

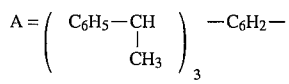

$x=60$ $y=0$ $R_1 = R_2 = H$

An acid value of $I_A$ - 39 mg/g was determined in accordance with Standard NF T30-402. The infrared spectrum is shown in FIG. 2.

Test 9

"Invention limit" dispersant, called product 9, composed of a phosphoric monoester corresponding to general formula (I), where:

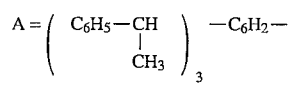

$x=40$ $y=0$ $R_1 = R_2 = H$

Figure 3:
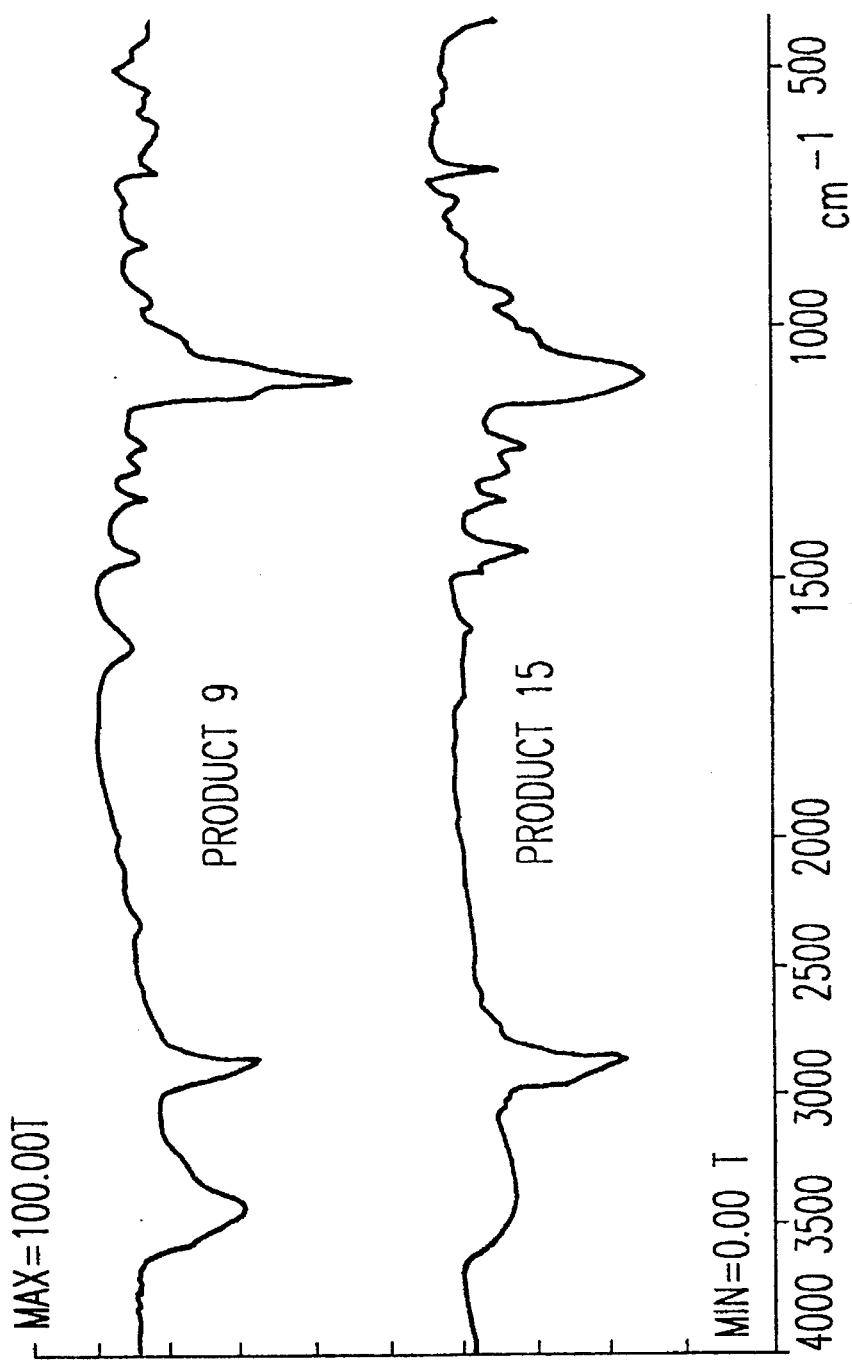

An acid value of $I_A = 55$ mg/g was determined in accordance with Standard NF T30-402. The infrared spectrum is shown in FIG. 3.

Test 10

Dispersant according to prior art, called product 10, corresponding to the general formula:

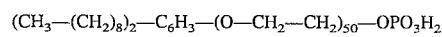

having no polyaryl A radical and having an acid value of $I_A = 55$ mg/g. The infrared spectrum is shown in FIG. 1.

Table II presents the Brookfield viscosities for each of the above-mentioned composition, all of which have the same base resin (CRISTIC 192 LV), the same MILLICARB content (66% by weight of the total weight of the resin and filler), the same dispersant content (0.5% by weight of the filler), but as the single variable, the chemical formula of the dispersing agent.

TABLE II

|  |  | PRIOR ART | INVENTION |  | INVENTION LIMIT | PRIOR ART |
|---|---|---|---|---|---|---|
| TEST | NO. | 6 | 7 | 8 | 9 | 10 |
| Resin | Type | Cristic 192 LV | Cristic 192 LV | Cristic 192 LV | Cristic 192 LV | Cristic 192 LV |

TABLE II-continued

| Filler | Type | Millicarb | Millicarb | Millicarb | Millicarb | Millicarb |
|---|---|---|---|---|---|---|
| | Quantity in % by weight of the filler and resin | 66% | 66% | 66% | 66% | 66% |
| Dispersant | Type | Wayfos M100 | Product 4 | Product 8 | Product 9 | Product 10 |
| | Quantity in % by weight of the filler | 0.5% | 0.5% | 0.5% | 0.5% | 0.5% |
| Brookfield viscosity module 6 in mPa · s (cP) | 0.5 R/mn | 88,000 | 4,000 | 4,000 | 3,600 | 4,000 |
| | 1 R/mn | 55,000 | 4,000 | 4,000 | 3,600 | 4,000 |
| | 2.5 R/mn | 31,200 | 4,480 | 4,400 | 4,080 | 4,480 |
| | 5 R/mn | 22,000 | 4,800 | 4,700 | 4,560 | 4,960 |
| | 10 R/mn | 16,700 | 5,240 | 5,100 | 5,4440 | 5,920 |
| | 20 R/mn | 13,750 | 6,220 | 6,100 | 7,250 | 7,800 |
| | 50 R/mn | 12,100 | 8,670 | 8,600 | 11,300 | 11,720 |
| | 100 R/mn | 11,300 | 10,600 | 10,600 | 14,500 | 15,320 |

Table II shows that the thermosetting compositions obtained using the dispersing agent according to the invention (Tests 7 and 8) are the only ones which lack a yield point and have minimal viscosities for all tested shear ratios. Although Tests 9 and 10 have no yield point, they have increased viscosities at higher shear ratios. The composition containing the dispersing agent according to the prior art (Test 6) has high viscosities for low shear ratios.

Tests 7, 8, 9, and 10 are different based upon the dispersant used. In Tests 7 and 8, the dispersant contains a polyaryl radical and 50 or 60 units of alkylene oxide. In Test 9, the dispersant contains a polyaryl radical but only has 40 units of ethylene oxide. Similarly, the difference among the dispersants used in Tests 7 and 10 arise from the radical, which is not polyaryl in Test 10, while the number of alkylene oxide groups is identical.

Thus, the dispersants used must have more than 40 units of alkylene polyoxide groups and a polyaryl radical in order to obtain a thermosetting composition without a yield point and with minimal Brookfield viscosities at high shear ratios.

EXAMPLE 3

Thermosetting compositions are prepared under the same conditions and having the same quantities as the compositions in Example 1 except that the dispersants are as follows:

Test 11

Dispersant according to the prior art, marketed by the PHILIP A. HUNT Company under the name WAYFOS M100, previously used in Test 2.

Test 12

Dispersant according to the invention, named product 4, previously used in Tests 4 and 7.

Test 13

Dispersant according to the invention, named product 8, previously used in Test 8.

Test 14

Dispersant according to the invention, named product 5, previously used in Test 5.

Test 15:

"Invention limit" dispersant, named product 15, composed of a mixture or phosphoric mono- and diester corresponding to general formula (I), where:

For the monoester:

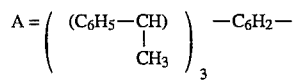

$$A = \left( \begin{array}{c} (C_6H_5-CH) \\ | \\ CH_3 \end{array} \right)_3 -C_6H_2-$$

x=16 y=0

$R_1=R_2=H$

For the diester:

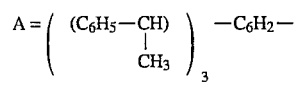

$$A = \left( \begin{array}{c} (C_6H_5-CH) \\ | \\ CH_3 \end{array} \right)_3 -C_6H_2-$$

x=16 y=0

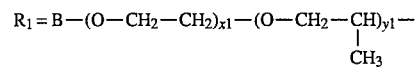

$$R_1 = B-(O-CH_2-CH_2)_{x1}-(O-CH_2-CH)_{y1}- \\ | \\ CH_3$$

x1=16 y1=0

B=A  $R_2$= H

An acid value of $I_A$=60 mg/g was determined in accordance with Standard NF T30-402. The infrared spectrum is shown in FIG. 3.

Test 16

"Invention limit" dispersant, called product 9, previously used in Test 9.

Using the same operating procedures used in Example 1, the viscosities of the thermosetting compositions were measured and are presented in Table III.

TABLE III

| | | PRIOR ART | | INVENTION | | INVENTION LIMIT | |
|---|---|---|---|---|---|---|---|
| TEST | NO. | 11 | 12 | 13 | 14 | 15 | 16 |
| Resin | Type | Cristic 192 LV | Cristic 192 LV | Cristic 192 LV | Cristic 192 LV | Cristic 192 LV | Cristic 192 LV |
| Filler | Type | Martinal OL 104 C | Martinal OL 104 C | Martinal OL 104 C | Martinal OL 104 C | Martinal OL 104 C | Martinal OL 104 C |
| | Quantity in % by weight of the filler and resin | 50% | 50% | 50% | 50% | 50% | 50% |
| Dispersant | Type | Wayfos M100 | Product 4 | Product 8 | Product 5 | Product 15 | Product 9 |
| | Quantity in % by weight of the filler | 1% | 1% | 1% | 1% | 1% | 1% |
| Brookfield viscosity module 6 in mPa · s (cP) | 0.5 R/mn | 182,000 | 10,000 | 4,000* | 14,000 | 20,000 | 10,000 |
| | 1 R/mn | 110,000 | 10,000 | 4,000* | 13,000 | 20,000 | 10,000 |
| | 2.5 R/mn | 56,000 | 8,800 | 4,000* | 10,000 | 20,000 | 10,000 |
| | 5 R/mn | 34,000 | 7,200 | 4,250* | 8,200 | 15,000 | 8,400 |
| | 10 R/mn | 21,600 | 6,200 | 4,000* | 7,500 | 12,500 | 7,200 |
| | 20 R/mn | 14,200 | 5,250 | 3,860* | 6,650 | 11,000 | 6,500 |
| | 50 R/mn | 8,400 | 4,300 | 3,640* | 5,940 | 11,000 | 6,300 |
| | 100 R/mn | 5,900 | 3,900 | 3,540* | 5,550 | 9,700 | 5,900 |

*Indicates that the viscosity was measured using module 5, since viscosity was too low to use module 6?

Figure 4:
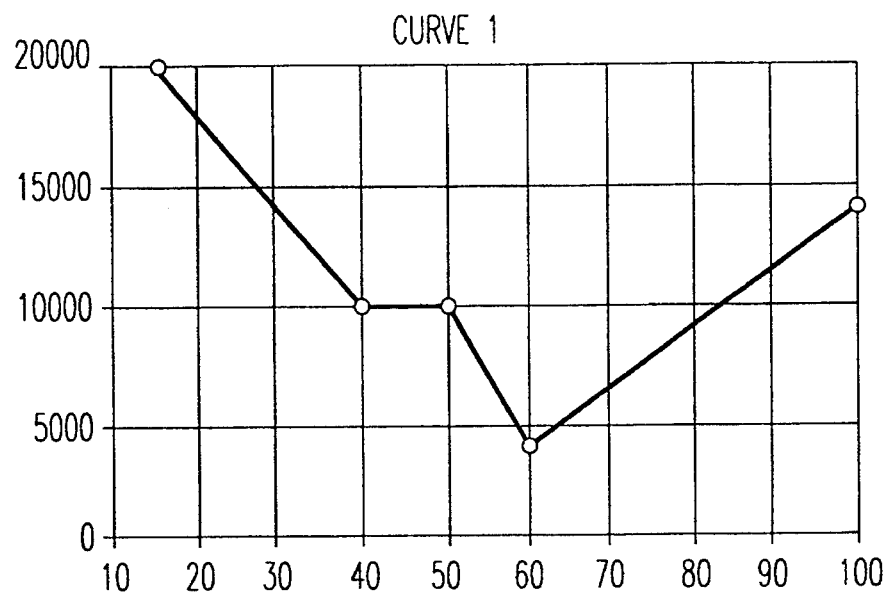
FIGS. 4 and 5 show the curves for the variation of the Brookfield viscosity in mPa.s at 0.5 R/mn and 100 R/mn as a function of the number of moles of alkylene oxide contained in the general formula (I) of the dispersing agent.
Figure 5:
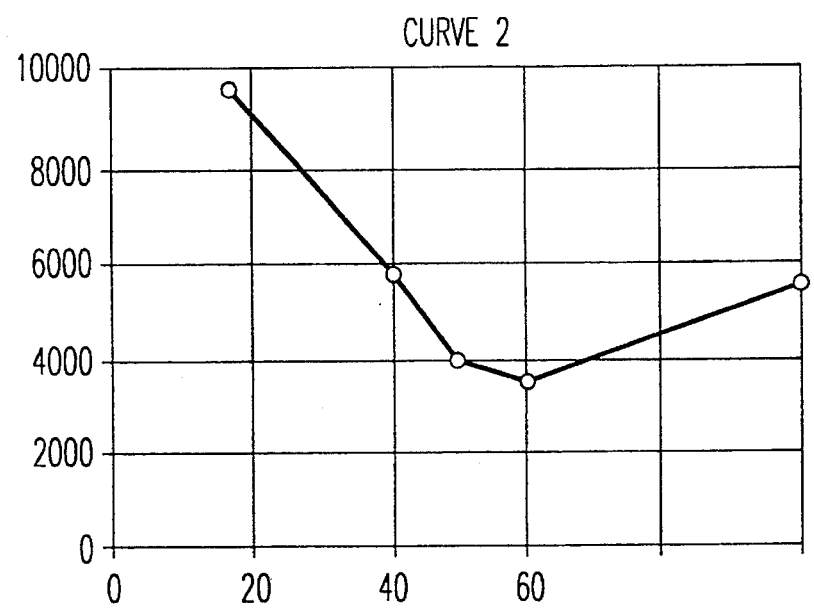

Based on the results in Table III, curves 1 and 2 (illustrated in FIGS. 4 and 5, respectively) were plotted. Curve 1 (FIG. 4) shows the variation of the Brookfield viscosity in mPa.s at 0.5 R/mn as a function of the number of moles of alkylene oxide contained in the general formula (I) of the dispersant. Curve 2 (FIG. 5) shows the variation of the Brookfield viscosity in mPa.s at 100 R/mn as a function of the number of moles of alkylene oxide contained in the general formula (I) of the dispersant. These lines confirm the observation that, when there are more than 40 alkylene oxide groups in the dispersant used, the Brookfield viscosity of the thermosetting composition is very low for low shear ratios and minimal for higher shear ratios, and that the preferred range of the number of alkylene oxide groups contained in the dispersing agent having the general formula (I) is between 50 and 60 groups.

EXAMPLE 4

Under the conditions of Example 1, the proportion of filler added to the mixture composed of resin and dispersant was increased while the proportion of dispersant in relation to the filler was maintained as a constant.

Tests 17 to 22 were prepared using 200 g of unsaturated polyester resin marketed by WALTER MADER AG under the name CRISTIC 192 LV as follows:

Test 17

400 g of calcium carbonate having an average granulometry of 3.2 μm, marketed by OMYA S.A. under the name MILLICARB, and 4 g of the dispersant marketed by the PHILIP A. HUNT Company under the name WAYFOS M100.

Test 18

500 g of the calcium carbonate used in Test 17, and 5 g of the dispersant used in Test 17.

Test 19

600 g of the calcium carbonate used in Test 17, and 6 g of the dispersant used in Test 17.

Test 20

400 g of the calcium carbonate used in Test 17, and 4 g of the dispersant according to the invention, termed product 8, previously used in Test 8.

Test 21

500 g of the calcium carbonate used in Test 17, and 5 g of the dispersant, product 8.

Test 22

600 g of the calcium carbonate used in Test 17, and 6 g of the dispersant, product 8.

Under the operating conditions used in Example 1, the Brookfield viscosities of the thermosetting compositions were measured using modules 6 and 7. The results are presented in Table IV.

TABLE IV

| | | PRIOR ART | | | INVENTION | | |
|---|---|---|---|---|---|---|---|
| TEST | NO. | 17 | 18 | 19 | 20 | 21 | 22 |
| Resin | Type | Cristic | Cristic | Cristic | Cristic | Cristic | Cristic |

TABLE IV-continued

| Filler | Type | 192 LV Millicarb | 192 LV Millicarb | 192 LV Millicarb | 192 LV Millicarb | 192 LV Millicarb | 192 LV Millicarb |
|---|---|---|---|---|---|---|---|
| | Quantity in % by weight of the filler and resin | 66.6% | 71.4% | 75.0% | 66.6% | 71.4% | 75.0% |
| Dispersant | Type | Wayfos M100 | Wayfos M100 | Wayfos M100 | Product 8 | Product 8 | Product 8 |
| | Quantity in % by weight of the filler | 1% | 1% | 1% | 1% | 1% | 1% |
| Brookfield viscosity module 7 in mPa · s (cP) | 0.5 R/mn | 200,000 | 512,000 | 1,176,000 | 4,000* | 10,000* | 40,000 |
| | 1 R/mn | 124,000 | 296,000 | 704,000 | 5,000* | 10,000* | 40,000 |
| | 2.5 R/mn | 64,000 | 153,000 | 392,000 | 5,600* | 11,200* | 41,600 |
| | 5 R/mn | 41,600 | 101,600 | 273,600 | 6,000* | 12,000* | 44,000 |
| | 10 R/mn | 28,400 | 70,400 | 204,000 | 6,300* | 13,000* | 53,200 |
| | 20 R/mn | 21,000 | 52,000 | 167,600 | 6,800* | 15,300* | 78,400 |
| | 50 R/mn | 15,520 | 38,000 | Measurement impossible material unsuitable | 8,600* | 23,840 | Measurement impossible, material unsuitable |
| | 100 R/mn | 13,240 | 32,000 | idem | 11,280 | 32,000 | idem |

*Indicates that the viscosity was measured using module 6, since viscosity was too low to be measured using module 7

Table IV shows that the thermosetting composition according to the invention preserves the absence of a yield point despite the increase in filler content.

EXAMPLE 5

Under the conditions of Example 1, thermosetting compositions were prepared using increasing quantities of the dispersing agent. For 200 g of unsaturated polyester resin marketed by WALTER MADER AG under the name CRISTIC 192LV, and for 400 g of natural calcium carbonate marketed by OMYA, S.A. under the name MILLICARB, 2 g of dispersant were used for Tests 23 and 24, 4 g for Tests 25 and 26, 8 g for Tests 27 and 28, and 20 g for Tests 29 and 30.

Under the operating conditions of Example 1, modules 5, 6, or 7 were used to measure the Brookfield viscosities of the thermosetting compositions thus obtained. Table V, below, shows that the addition of increasing quantities of dispersing agent according to the invention, added in a proportion ranging up to 5% by weight, and preferably 3% by weight, of the filler, allows a lowering of the Brookfield viscosity of the thermosetting composition, while the dispersants according to prior art produce a thickening effect under a low shear ratio (up to 20 R/mn).

This capacity to lower the Brookfield viscosity makes it possible to chose the desired viscosity for the composition by adjusting the quantity of dispersant to be added.

TABLE V

| TEST | NO. | 23 | 24 | 25 | 26 | 27 | 28 | 29 | 30 |
|---|---|---|---|---|---|---|---|---|---|
| Resin | Type | Cristic 192 LV | Cristic 192 LV | Cristic 192 LV | Cristic 192 LV | Cristic 192 LV | Cristic 192 LV | Cristic 192 LV | Cristic 192 LV |
| Filler | Type | Millicarb | Millicarb | Millicarb | Millicarb | Millicarb | Millicarb | Millicarb | Millicarb |
| | Quantity in % by weight filler + resin | 66% | 66% | 66% | 66% | 66% | 66% | 66% | 66% |
| Dispersant | Type | Wayfos M100 | Product 8 | Wayfos M100 | Product 8 | Wayfos M100 | Product 8 | Wayfos M100 | Product 8 |
| | Quantity in % by weight filler | 0.5% | 0.5% | 1% | 1% | 2% | 2% | 5% | 5% |
| Brookfield viscosity module 6 in mPa · s (cP) | 0.5 R/mn | 120,000 | 5,600* | 218,000 | 5,600* | 314,000 | 5,600* | 524,000 | 8,000* |
| | 1 R/mn | 72,000 | 6,000* | 130,000 | 6,400* | 178,000 | 5,600* | 294,000 | 8,000* |
| | 2.5 R/mn | 40,400 | 6,400* | 69,600 | 6,400* | 90,000 | 5,800* | 144,000 | 8,500* |
| | 5 R/mn | 27,600 | 7,000* | 46,400 | 7,000* | 56,200 | 6,000* | 86,800 | 8,600* |
| | 10 R/mn | 23,500 | 8,200* | 32,600 | 7,640* | 37,400 | 6,100* | 58,400 | 8,600* |
| | 20 R/mn | 18,700 | 10,600* | 24,800 | 8,500* | 26,500 | 6,400* | 54,600** | 9,500 |

TABLE V-continued

| | | | | | | | | |
|---|---|---|---|---|---|---|---|---|
| 50 R/mn | 17,500** | 14,600** | 21,200** | 12,100** | 20,200** | 7,100* | 32,800** | 9,700 |
| 100 R/mn | 16,800** | 16,800** | 17,600** | 13,200** | 15,800** | 8,200 | 24,000** | 10,600** |

*Indicates that the measurements were made using module 5, since viscosities were too low for module 6
**Indicates that the measurements were made using module 7, since viscosities were too high for module 6

EXAMPLE 6

Under the conditions of Example 1, thermosetting compositions were prepared using several types of resins. Tests 31 to 33 were conducted using 200 g of acrylic resin, marketed by the I.C.I. company under the name MODAR 826 HT and having a Brookfield viscosity of 220 mPa.s at 10 R/mn (module 4) and of 250 mPa.s at 100 R/mn (module 4) at ambient temperature; 400 g of natural calcium carbonate marketed by OMYA, S.A. under the name of MILLICARB; and 4 g of dispersant. Tests 34 to 36 were conducted with 200 g of an unsaturated polyester resin having a higher molecular weight and a Brookfield viscosity of 2,880 mPa.s at 10 R/mn (module 5) and 2,940 mPa.s at 100 R/mn (module 5) at ambient temperature; 300 g of the same calcium carbonate as previously used; and 4 g of dispersant. Tests 37 and 38 were performed using 200 g of an unsaturated polyester resin distributed by the STRAND GLASS Company under the name CRISTIC 191 LV, whose Brookfield viscosity is 700 mPa.s at 10 R/mn (module 3) and 250 mPa.s at 100 R/mn, (module 3) at ambient temperature; 400 g of the same calcium carbonate as previously used; and 8 g of dispersant.

Once these thermosetting compositions were prepared, the same operating procedure as in Example 1 was implemented in order to measure their Brookfield viscosities, which appear in Table VI, below.

EXAMPLE 7

Under the operating conditions of Example 1, thermosetting compositions were fabricated using two types of fillers. Test 39 was conducted using 300 g of an unsaturated polyester resin marketed by WALTER MADERAG under the name CRISTIC 192 LV; 300 g of titanium dioxide marketed by the THANN & MULHOUSE Company under the name AT1; and 3 g of dispersing agent according to the invention, called product 8. Test 40 was conducted using the same quantities and types of resin and filler as in Test 39, but without the dispersing agent. Test 41 was conducted using 300 g of the same unsaturated polyester resin used in Tests 39 and 40; 400 g of hydrous calcium sulfate having an average granulometry of approximately 15 micrometers; and 2 g of the dispersing agent according to the invention used in Test 39, named product 8. Test 42 was conducted using the types and amounts of resin and filler used in test 41, but without the dispersing agent.

Once these thermosetting compositions were prepared, the operating procedure used in Example 1 was used to measure their Brookfield viscosities, which are provided in Table VII, below.

TABLE VI

| TEST | NO. | 31 | 32 | 33 | 34 | 35 | 36 | 37 | 38 |
|---|---|---|---|---|---|---|---|---|---|
| Resin | Type | Modar 826 HT | Modar 826 HT | Modar 826 HT | Polyester high mol. weight | Polyester high mol. weight | Polyester high mol. weight | Cristic 191 LV | Cristic 191 LV |
| Filler | Type | Millicarb | Millicarb | Millicarb | Millicarb | Millicarb | Millicarb | Millicarb | Millicarb |
| | Quantity in % by weight filler + resin | 66% | 66% | 66% | 60 | 60 | 60 | 66% | 66% |
| Dispersant | Type | Wayfos M100 | Product 4 | Product 8 | Wayfos M100 | Triton QS44 | Product 8 | Wayfos M100 | Product 8 |
| | Quantity in % by weight filler | 1% | 1% | 1% | 1.3% | 1.3% | 1.3% | 2% | 2% |
| Brookfield viscosity module 6 in mPa · s (cP) | 0.5 R/mn | 110,000 | 10,000 | 20,000 | 432,000* | 424,000* | 32,000* | 400,000* | 10,000 |
| | 1 R/mn | 65,000 | 8,000 | 16,000 | 260,000* | 260,000* | 32,000* | 228,000* | 13,000 |
| | 2.5 R/mn | 34,000 | 6,000 | 10,800 | 144,000* | 134,400* | 32,000* | 122,000* | 13,200 |
| | 5 R/mn | 22,000 | 5,400 | 8,800 | 96,000* | 92,000* | 28,800* | 81,600* | 13,600 |
| | 10 R/mn | 14,800 | 4,900 | 7,500 | 68,000* | 66,400* | 28,800* | 56,800* | 14,200 |
| | 20 R/mn | 10,500 | 4,550 | 6,550 | 51,000* | 52,000* | 29,200* | 41,400* | 15,400 |
| | 50 R/mn | 7,320 | 4,280 | 6,000 | 36,560* | 40,960* | 30,240* | 30,100* | 18,500 |
| | 100 R/mn | 6,020 | 4,250 | 5,870 | 30,000* | 34,220* | 30,000* | 25,100* | 23,600* |

*Indicates that the measurements were made using module 7 since viscosities were too high for module 6

Table VI shows that the dispersants according to the invention are effective for various types of resins.

TABLE VII

| TEST | NO. | 39 | 40 | 41 | 42 |
|---|---|---|---|---|---|
| Resin | Type | Cristic 192 LV | Cristic 192 LV | Cristic 192 LV | Cristic 192 LV |
| Filler | Type | $TiO_2$ ATT | $TiO_2$ ATT | Calcium sulfate | Calcium sulfate |
|  | Quantity in % by weight of resin + filler | 50% | 50% | 66% | 66% |
| Dispersant | Type | Product 8 |  | Product 8 |  |
|  | Quantity in % by weight of filler | 1% | 0% | 0.5% | 0% |
| Brookfield viscosity module 6 in mPa · s (cP) | 0.5 R/mn | 10,000 | 32,000 | 30,000 | 200,000 |
|  | 1 R/mn | 8,000 | 25,000 | 40,000 | 130,000 |
|  | 2.5 R/mn | 6,800 | 22,800 | 53,000 | 90,000 |
|  | 5 R/mn | 6,000 | 20,800 | 57,000 | 74,000 |
|  | 10 R/mn | 5,200 | 18,700 | 54,600 | 64,000 |
|  | 20 R/mn | 4,750 | 16,800 | 46,600 | 52,000* |
|  | 50 R/mn | 4,200 | 13,200 | 40,400 | 52,000* |
|  | 100 R/mn | 3,900 | 9,800* | 29,200 | Measurement impossible, material unsuitable |

*Indicates that measurements were made using module 7, since viscosities were too high for module 6

Table VII shows that the dispersing agent according to the invention is also effective for pulverulent mineral fillers other than calcium carbonate and aluminum hydroxide, such as titanium oxide and calcium sulfate.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Thermosetting composition, comprising;
   (a) a thermosetting resin,
   (b) a pulverulent mineral filler in a quantity ranging up to 75% by weight of the total weight of the resin and the filler,
   (c) an organophosphate dispersing agent, in an amount of 0.3 to 5% by weight of the weight of the filler, having the following general formula:

$$A-(O-CH_2-CH_2)_x-(O-CH_2-\underset{CH_3}{CH})_y-O-\underset{OR_2}{\overset{\overset{O}{\|}}{P}}-OR_1 \quad (I)$$

where:
A is a branched or unbranched polyaryl group,
x and y are whole numbers between 0 and 100 such that x+y is a whole number greater than 40 but not greater than 100,

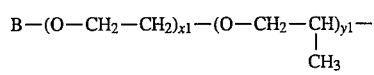

x1 and y1 are whole numbers between 0 and 100 such that x1+ y1 is a whole number not greater than 100,
B is a branched or unbranched polyaryl group, or an alkyl, aryl, arylalkyl, alkylaryl, alkanoyl, or amine radical,

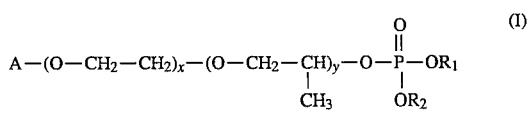

x2 and y2 are whole numbers between 0 and 100 such that x2+ y2 is a whole number not greater than 100,
E is a branched or unbranched polyaryl group, or an alkyl, aryl, arylalkyl, alkylaryl, alkanoyl, or amine radical, and $R_1$ and $R_2$ may be identical or different.

2. Thermosetting composition according to claim 1, further comprising one or more conventional additives selected from the group consisting of thermal stabilizers, photochemical stabilizers, oxidation inhibitors, shrinkage inhibitors, static inhibitors, plasticizers, lubricants, unmolding agents, flame retardants, glass fibers, glass balls, and mineral thickeners.

3. Thermosetting composition according to claim 1, wherein the thermosetting resin is an acrylic or unsaturated polyester resin.

4. Thermosetting composition according to claim 1, wherein the pulverulent mineral filler is selected from the group consisting of calcium carbonate, aluminum hydroxide, calcium sulfate, titanium oxide, and mixtures thereof.

5. Thermosetting composition according claim 1, wherein the quantity of dispersing agent is between 0.5 and 3% by weight of the weight of the filler.

6. Thermosetting composition according to claim 1, wherein the polyaryl group A of the organophosphate dispering agent has a molecular weight of between 127 and 2,000.

7. Thermosetting composition according to claim 1, wherein the number of alkylene oxides x+y of the organophosphate dispersing agent is 50 to 60.

8. A method of mass molding or sheet molding comprising using a bulk molding composition (BMC) or a sheet molding composition (SMC) comprising a thermosetting composition, comprising;
   (a) a thermosetting resin,
   (b) a pulverulent mineral filler in a quantity ranging up to 75% by weight of the total weight of the resin and the filler,
   (c) an organophosphate dispersing agent in an amount of 0.3 to 5% by weight of the weight of the filler having the following general formula:

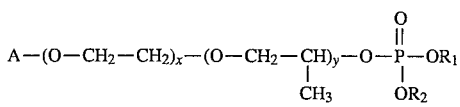

where:
A is a branched or unbranched polyaryl group,
x and y are whole numbers between 0 and 100 such that x+y is a whole number greater than 40 but not greater than 100,

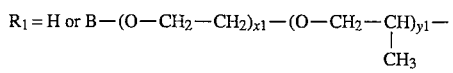

x1 and y1 are whole numbers between 0 and 100 such that x1+y1 is a whole number not greater than 100,
B is a branched or unbranched polyaryl group, or an alkyl, aryl, arylalkyl, alkylaryl, alkanoyl, or amine radical,

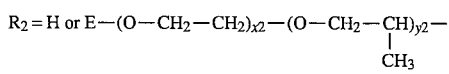

x2 and y2 are whole numbers between 0 and 100 such that x2=y2 is a whole number not greater than 100,
E is a branched or unbranched polyaryl group, or an alkyl, aryl, arylalkyl, alkylaryl, alkanoyl, or amine radical, and $R_1$ and $R_2$ may be identical or different.

9. The thermosetting composition according to claim 1, wherein said polyaryl group A comprises di(phenyl-1-ethyl) phenols, tri(phenyl-1-ethyl) phenols, tri(phenyl-1-ethyl)phenols or oligomers of polystyrene or styrene copolymer oligomers with another monomer.

10. The thermosetting composition according to claim 1, wherein each of polyaryl groups B and E comprises di(phenyl-1-ethyl)phenols, tri(phenyl-1-ethyl)phenols, tri(phenyl-1-ethyl)phenols or oligomers of polystyrene or styrene copolymer oligomer with another monomer.

11. The thermosetting composition according to claim 1, which comprises a phosphoric monoester and a phosphoric diester of the formula (I).

12. The thermosetting composition according to claim 11, which comprises a phosphoric monoester and a phosphoric diester having the formula (I), wherein:

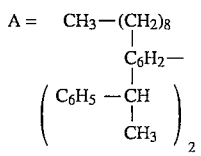

x=48 y=2
$R_1=R_2=H$
For the diester:

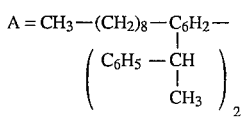

x=48 y=2

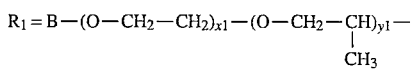

x1=48 y1=2
B=A $R_2$=H

* * * * *

UNITED STATES PATENT AND TRADEMARK OFFICE
CERTIFICATE OF CORRECTION

PATENT NO. : 5,464,895
DATED : NOVEMBER 7, 1995
INVENTOR(S) : PIERRE BLANCHARD ET AL

It is certified that error appears in the above-indentified patent and that said Letters Patent is hereby corrected as shown below:

Column 8, line 19, "$I_A$ - 39mg/g" should read --$I_A$ = 39mg/g--; and line 55, "filler," should read --filler),--.

Columns 9 and 10, Table II-continued, 6th column, fourth entry from the bottom, "5,4440" should read --5,440--.

Columns 11 and 12, TABLE III, notice at the bottom of table, "6?" should read --6.--

Column 16, line 13, "MADERAG" should read --MADER AG--.

UNITED STATES PATENT AND TRADEMARK OFFICE
CERTIFICATE OF CORRECTION

PATENT NO. : 5,464,895
DATED : NOVEMBER 7, 1995
INVENTOR(S) : PIERRE BLANCHARD ET AL

It is certified that error appears in the above-indentified patent and that said Letters Patent is hereby corrected as shown below:

Column 18, line 59, "according claim" should read --according to claim--.

Column 19, line 40, "x2=y2" should read --x2+y2--.

Signed and Sealed this

Twenty-seventh Day of August, 1996

Attest:

BRUCE LEHMAN

Attesting Officer

Commissioner of Patents and Trademarks